(12) United States Patent  
Hornby et al.

(10) Patent No.: US 6,534,943 B1  
(45) Date of Patent: Mar. 18, 2003

(54) ROBOT DEVICE AND LEARNING METHOD OF ROBOT DEVICE

(75) Inventors: Gregory Hornby, Waltham, MA (US); Seiichi Takamura, Tokyo (JP); Masahiro Fujita, Saitama (JP); Takashi Yamamoto, Tokyo (JP); Osamu Hanagata, Tokyo (JP); Jun Yokono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/694,957

(22) Filed: Oct. 24, 2000

(30) Foreign Application Priority Data

Oct. 25, 1999 (JP) ............................................. 11-303163  
Oct. 20, 2000 (JP) ......................................... 2000-327028

(51) Int. Cl.⁷ .................................................. B25J 5/00
(52) U.S. Cl. ............... 318/568.12; 318/568; 318/568.1; 318/568.11; 318/568.2; 700/245
(58) Field of Search ............................... 318/568, 568.1, 318/568.12, 568.2, 568.11; 180/8; 700/245

(56) References Cited

U.S. PATENT DOCUMENTS

| | | | | |
|---|---|---|---|---|
| 5,063,492 A | * | 11/1991 | Yoda et al. ............. | 364/167.01 |
| 5,212,632 A | * | 5/1993 | Ito et al. ...................... | 364/151 |
| 5,343,397 A | * | 8/1994 | Yoshino et al. ......... | 364/424.04 |
| 5,350,912 A | * | 9/1994 | Ishida ........................ | 250/202 |
| 5,426,586 A | * | 6/1995 | Ozawa ................... | 364/424.02 |
| 5,551,525 A | * | 9/1996 | Pack et al. ................... | 180/8.6 |
| 5,758,734 A | * | 6/1998 | Hong et al. .................. | 180/8.1 |
| 5,841,258 A | * | 11/1998 | Takenaka ............... | 318/568.12 |
| 5,929,585 A | * | 7/1999 | Fujita ..................... | 318/568.2 |
| 6,038,493 A | * | 3/2000 | Tow ........................... | 700/259 |
| 6,068,073 A | * | 5/2000 | Roston et al. ................ | 180/8.5 |
| 6,231,140 B1 | * | 11/2001 | Fujita et al. ................ | 700/248 |
| 6,317,652 B1 | * | 11/2001 | Osada ........................ | 700/245 |
| 6,381,515 B1 | * | 4/2002 | Inoue et al. ................. | 700/245 |
| 6,411,055 B1 | * | 6/2002 | Fujita et al. ........... | 318/568.12 |
| 6,438,454 B1 | * | 8/2002 | Kuroki ....................... | 700/245 |

FOREIGN PATENT DOCUMENTS

| | | | | |
|---|---|---|---|---|
| JP | 11-188678 | * | 7/1999 | ............. B25J/13/00 |
| JP | 2000-153476 | * | 6/2000 | .............. B25J/5/00 |

OTHER PUBLICATIONS

Nehmzow, Ulrich "Physically Embedded Genetic Algorithm Learning in Multi–Robot Scenarios: The PEGA Algorithm" University of Essex, Department of Computer Science 1999.*

* cited by examiner

*Primary Examiner*—Robert E. Nappi  
*Assistant Examiner*—Tyrone Smith  
(74) *Attorney, Agent, or Firm*—Frommer Lawrence & Haug LLP; Wlilliam S. Frommer

(57) ABSTRACT

A walking-type robot device and its learning method are disclosed, wherein the robot device is caused to perform walking that accords with the parameters for controlling the walking, the walking is evaluated, and the parameters are updated so that the very evaluation is enhanced. Besides, a walking-type robot device is provided with a controlling means for controlling the robot so as to cause it to perform walking that accords with parameters which prescribe the driving phase of each leg of the time of walking, an evaluating means for evaluating the velocity of the walking, and a parameter updating means for updating the parameters so that the evaluation of the walking by the evaluating means is enhanced.

7 Claims, 16 Drawing Sheets

| parameter | unit | initial range |
|---|---|---|
| body center x | mm. | 85-95 |
| body center z | mm. | -5-5 |
| body pitch | degrees | -5-5 |
| all legs y | mm. | 5-25 |
| front legs z | mm. | 24-40 |
| rear legs z | mm. | 15-29 |
| step length | n. a. | 80-220 |
| swing height | mm. | 15-29 |
| swing time | ms. | 200-400 |
| swing mult. | n. a. | 1.5-2.5 |
| switch time | ms. | 500-900 |
| ampl body x | mm. | -2-2 |
| ampl body y | mm. | 0-20 |
| ampl body z | mm. | -2-2 |
| ampl yaw | degrees | -2-2 |
| ampl pitch | degrees | -3-3 |
| ampl roll | degrees | -3-3 |
| min. gain | n. a. | 25-175 |
| shift | degrees | 60-120 |
| length | degrees | 90-150 |
| L-R | n. a. | 0.25-0.5 |
| F-H | n. a. | 0.5-0.75 |

FIG. 5

ROBOT DEVICE AND LEARNING METHOD OF ROBOT DEVICE

BACKGROUND OF THE INVENTION

1. Field of the Invention

This invention relates to a robot device and a learning method of a robot device, and more particularly, is suitably applied to a walking-type robot, for instance.

2. Description of the Related Art

Heretofore, a walking pattern of a walking-type robot has been generated in such a manner that the designer selects the respective parameter values of various parameters for walking control by the use of a dedicated program, or selects the respective parameter values of the various parameters by the use of the result that has been led mathematically in accordance with a certain controlling rule.

However, in the case where a lot of walking patterns are required, like the case where such a function that the walking pattern is gradually changed as the robot grows is installed on, for instance, a walking-type amusement robot, it is required to respectively select parameters that are suited for the various parameters for walking control, for each walking pattern, out of a redundant parameter slace. And, there have been such problems that, to perform such a work by hands, the designer has been required to have a high order of expertise of controlling theory, and otherwise, significant time has been required.

As an approach for solving such problems, there is such a method of modeling the walking pattern of a walking-type robot, performing simulations on a computer at the same time of changing sequentially various parameters for walking control, selecting the adequate parameters on the basis of the result of the simulations, and applying those parameters to the actual robot.

However, according to such a method, the result of the simulation is not ensured in an actual robot since it is difficult to correctly describe the model of the robot in a simulation or the dynamic characteristics, physical laws of the robot and the like, or because of the minute difference of the dynamic characteristics in each robot even of the same model. This is counted as a large problem at the site of development of the walking-type robot.

Therefore, it is inferred that, if the walking pattern of a walking-type robot is optimized and can be generated for each robot without requirement of a high order of expertise and/or a complicated work, it will be possible to make the walking pattern generating work easy, and to easily obtain wide variety of walking patterns that are suited to every use.

SUMMARY OF THE INVENTION

In view of the foregoing, an object of this invention is to provide a robot device and a learning method of robot device which can make the walking pattern generating work easy.

The foregoing object and other objects of the invention have been achieved by the provision of a walking-type robot device which comprises: a controlling means for controlling so that walking is performed in response to parameters for controlling the walking; an evaluating means for evaluating the walking; and a parameter updating means for updating the parameters so that the evaluation of the walking by the evaluating means is enhanced.

As a result of this, in this robot device, a walking pattern is gradually improved as the parameters are updated. Hence, according to this robot device, it is possible to obtain a walking pattern having a high evaluation, without requirement of a high order of expertise and/or a complicated work.

Besides, the present invention provides a walking-type robot device which comprises: a controlling means for causing the robot to perform walking that accords with parameters which prescribe the driving phase of each leg of the time of walking; an evaluating means for evaluating the velocity of the walking; and a parameter updating means for updating the parameters so that the evaluation of the walking by the evaluating means is enhanced.

As a result of this, in this robot device, a walking pattern gradually changes from gentle walking into dynamic walking as the parameters are updated. Hence, according to this robot device, it is possible to easily detect a gait that is most suited for the hardware of the very robot and/or the conditions such as the movement environment, as the gait of the time of dynamic walking.

Besides, the present invention provides a learning method of a walking-type robot device that comprises: a first step of causing the robot device to perform walking on the basis of the parameters; a second step of evaluating walking; and a third step of updating the parameters so that the evaluation of walking is enhanced.

As a result of this, in this robot device learning method, a walking pattern is gradually improved as the parameters are updated, and so it is possible to obtain a walking pattern having a high evaluation, without requirement of a high order of expertise and/or a complicated work.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a list showing twenty-two parameters for controlling the walking;

DETAILED DESCRIPTION OF THE EMBODIMENT

Preferred embodiments of this invention will be described with reference to the accompanying drawings:

(1) Principle

Heretofore, there is the genetic algorithm (GA), as an algorithm wherein mechanisms of heredity and evolution of a living thing have been modeled in an engineering manner.

Figure 1:
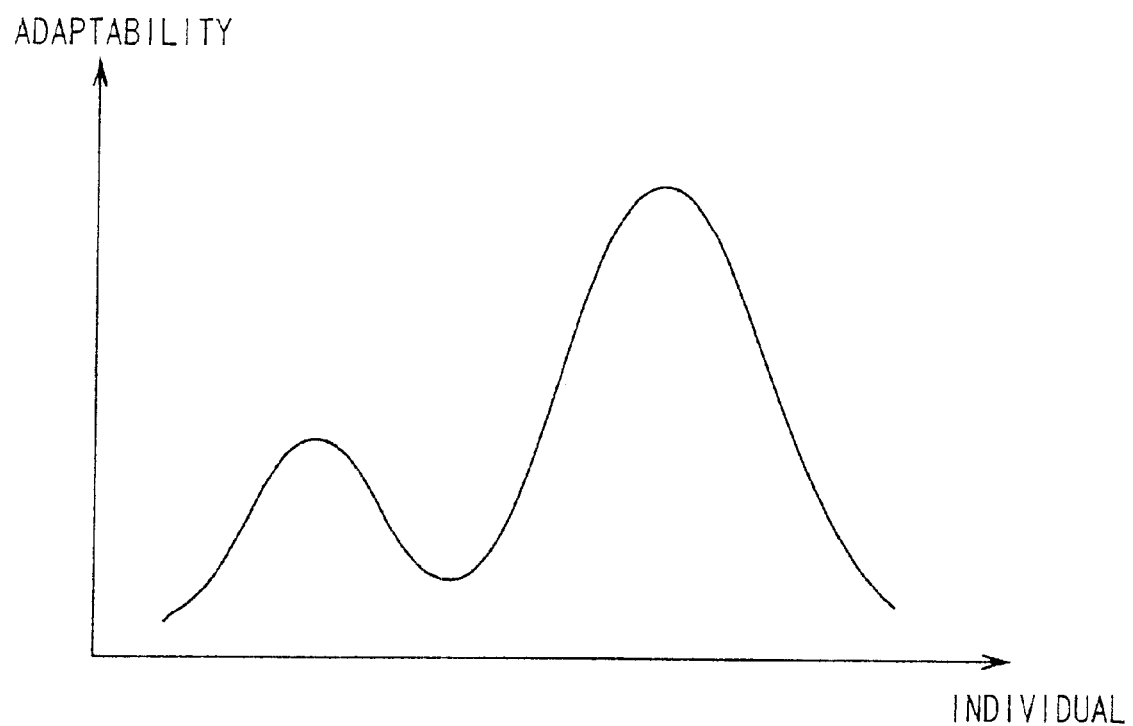
FIG. 1 is a characteristic curve that is utilized for explaining adaptability.

This genetic algorithm is such one that heredity and evolution of a living thing have been modeled, by repeating a series of processings such as selecting individuals from a population, evaluating the adaptabilities with respect to the selected individuals, and crossing the individuals on the basis of the very evaluations. Besides, in the genetic algorithm, mutating operations of individuals are also performed as necessary in the same manner as the natural world, in order to prevent the individuals from converging upon lower one of plural peaks of adaptabilities shown in FIG. 1 by a repetition of crossing. And, it is known that an individual that has high adaptability can be generated by employing this genetic algorithm.

The present invention aims to make the developing work of a walking-type robot easy, by causing an actual robot to automatically detect parameter values that are most suited for the hardware of the robot and the environment, as the parameter values of various parameters for walking control, employing this genetic algorithm.

Figure 2:
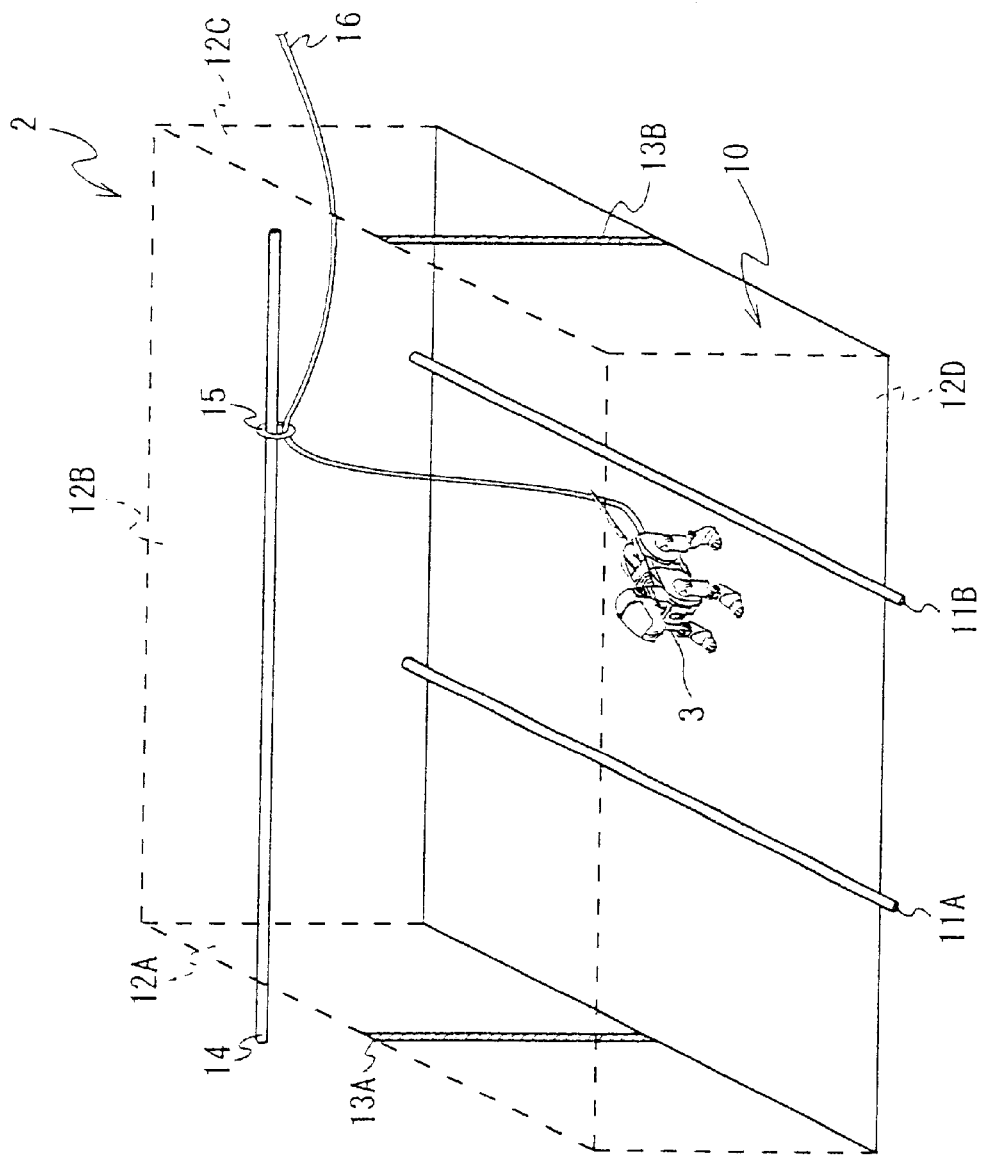
FIG. 2 is a schematic perspective view showing the configuration of a robot developing environment system according to the first embodiment.

(2) First Embodiment (2-1) Configuration of a Robot Developing Environment System According to the Present Embodiment Referring to FIG. 2, a robot developing environment system generally designated as 1 of the present embodiment is comprised of an environment unit 2 and a robot 3.

The environment unit 2 has a rectangular floor surface 10 of the stated area; on the floor surface 10, two parallel poles 11A and 11B of the stated diameter are arranged into right angles to the longitudinal direction of the floor surface 10.

Besides, the floor surface 10 is surrounded with plural standing walls 12A to 12D; to each inner wall surface of an opposed pair of walls 12A and 12C, narrow panels 13A and 13B of the stated respective colors (yellow and light blue, in this embodiment) are attached, such that they are perpendicular to the floor surface 10.

In addition, above the floor surface 10, a wire 14 is arranged such that it is laid over between the wall 12A and the wall 12C, and also a cable 16 for supplying the electric source voltage to the robot 3 is arranged such that it is supported by a slip ring 15 that is able to run along the wire 14.

Figure 3:
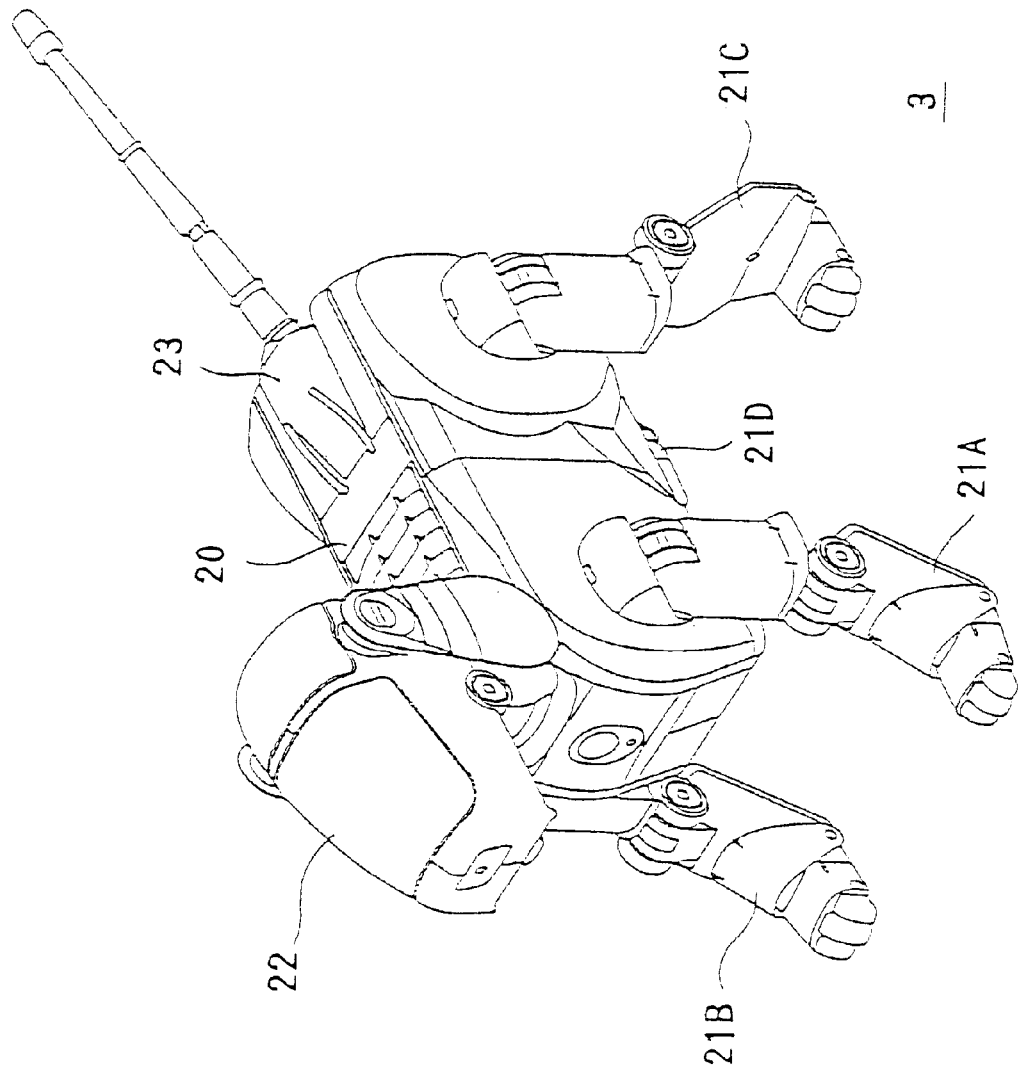
FIG. 3 is a perspective view showing the external appearance of a robot according to the first embodiment.

By this, in this environment unit 2, the robot 3 is enabled to freely move on the floor surface 10 for long time, without being intervolved to the cable 16. on the other hand, as shown in FIG. 3, the robot 3 has such a configuration that leg units 21A to 21D are respectively coupled to the front, the rear, the left and the right portions of a body unit 20, and a head unit 22 and a tail unit 23 are respectively coupled to the front end portion and the rear end portion of the body unit 20.

Figure 4:
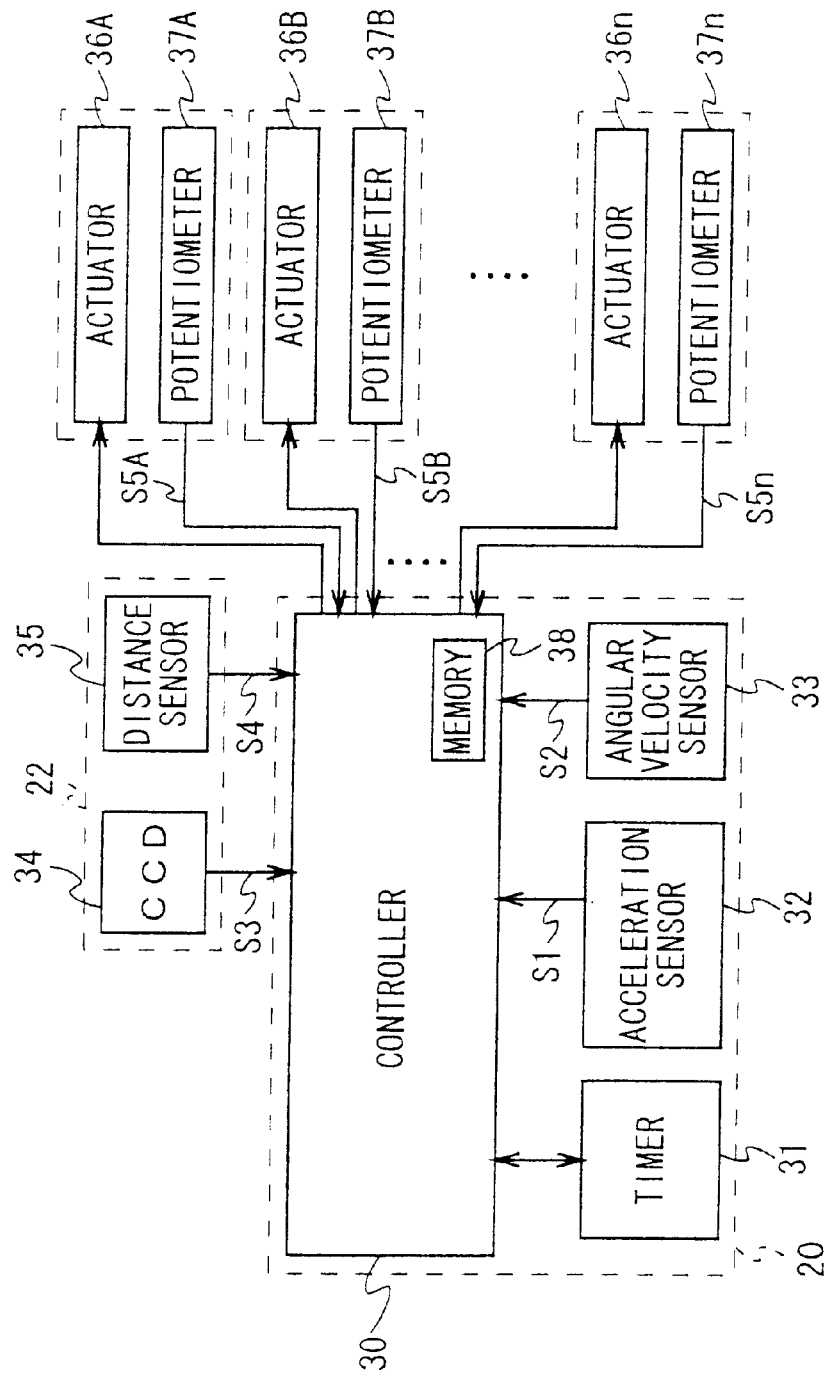
FIG. 4 is a block diagram showing an internal configuration of a robot according to the first embodiment.

In this case, as shown in FIG. 4, a controller 30, a timer 31, an acceleration censor 32, an angular velocity sensor 33 and others are contained in the body unit 20, and a charge coupled device (CCD) camera 34, a distance sensor 35 and others are arranged on the stated positions of the head unit 22.

Besides, to the joint portions of each leg unit 21A to 21D, each joint portion of each leg unit 21A to 21D and the body unit 20, the joint portion of the head unit 22 and the body unit 20, the joint portion of the tail unit 23 and the body unit 20, and others, actuators 36A to 36n and potentiometers 37A to 37n are arranged, the numbers of those are respectively corresponding to the number of degrees of freedom.

And, the acceleration censor 32 of the body unit 20 would detect the respective accelerations of three axes directions (X-axis, Y-axis, and Z-axis) for every tens milli-seconds, and send the results of the detections to the controller 30 as the acceleration detection signal S1. Besides, the angular velocity sensor 33 would detect the rotational angular velocity of three angle directions (angle R, angle P, and angle Y) for every tens milli-seconds, and send the results of the detection to the controller 30 as the angular velocity detection signal S2.

In addition, the CCD camera 34 would shoot the forward situation and send the obtained image signal S3 to the controller 30; the distance sensor 35 that is comprised of an infra-red distance sensor and others would measure the distance to the forward object, and send the result of the measurement to the controller 30 as the distance measurement signal S4. In addition, each potentiometer 37A to 37n would detect the rotational angle of the output shaft of the corresponding actuator 36A to 36n, and send the result of the detection to the controller 30 as the angle detection signal S5A to S5n.

The controller 30 would detect the panels 13A, 13B of the environment unit 2 on the basis of the image signal S3 given from the CCD camera 34, and control the driving of the respective actuators 36A to 36n, so that the robot 3 would walk toward one panel 13A, 13B for the stated prescribed time, and, after the walking of the prescribed time, change its direction and walk toward the other panel 13B, 13A for the stated prescribed time again.

Besides, on the basis of the acceleration detection signal S1, the angular velocity detection signal S2, the image signal S3, and the distance measurement signal S4 that are respectively supplied from the acceleration censor 32, the angular velocity sensor 33, the CCD camera 34, and the distance sensor 35 at this time, the controller 30 would evaluate the adaptability of the individual with respect to velocity and straightness, and change the walking pattern (that is, update the various parameters for walking control) so as to improve the evaluation on the basis of the result of the evaluation.

Hereinafter, the processing of the controller 30 like this is explained.

(2-2) Walking Pattern Generating Procedure According to the Present Embodiment (2-2-1) Various Parameters for Walking Control in the Robot 3

Now, the various parameters for walking control in this robot 3 are first explained. In the case of this robot 3, the walking control is performed on the basis of the controlling program that is described by the 22 parameters shown in FIG. 5 and stored in the memory 38.

And, these parameters are comprised of the parameters for determining the walking standard posture, the parameters for determining the movement of the legs, and the parameters for determining the movement of the whole body.

Hereinafter, these parameters are explained.

Figure 6:
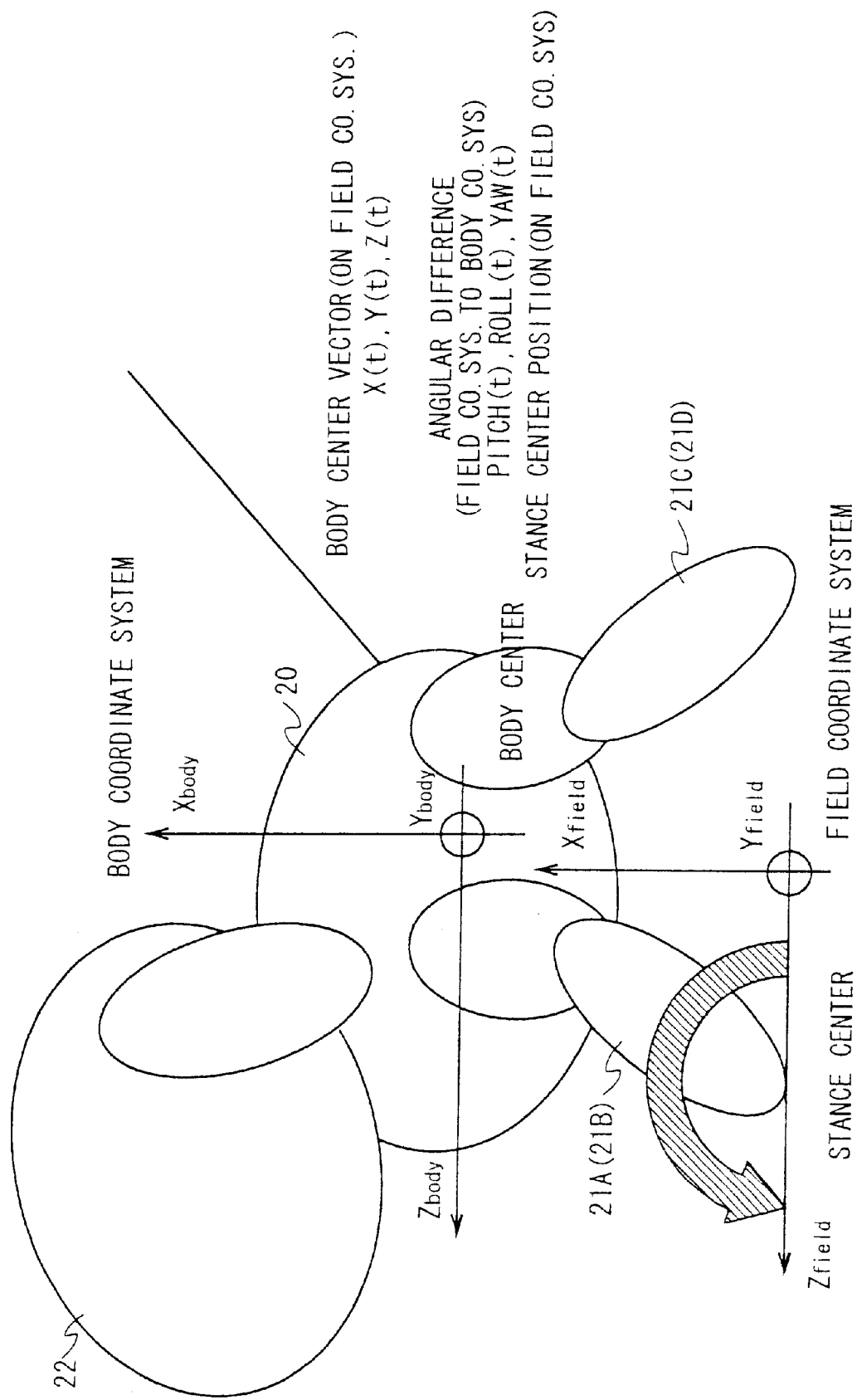
FIG. 6 is a schematic diagram showing the walking standard posture.

At first, as shown in FIG. 6, the central coordinate is set on the body unit 20 of the robot 3 that is stretching all four legs and standing. When this central coordinate has been set with respect to the absolute coordinate system, the leg units 21A to 21D are bent and the body becomes the stooped posture in the standard posture of walking, and the above-mentioned central coordinate is shifted in up-and-down direction and in front-and-rear direction on the absolute coordinate system. This value is controlled by the parameters, [body center x] and [body center z].

Besides, this standard posture of walking is not only translated but its body unit 20 is occasionally caused to forward inclination or backward inclination, and this is controlled with the parameter [body pitch]. In addition, in this standard posture, the grounding positions of the leg units 21A to 21D influence the walking, too. In order to reduce the number of parameters, the offsets of the straddle directions are set to the same value with respect to the front leg units and the rear leg units, 21A to 21D, and this is controlled with the parameter [all legs y].

As to the offsets of the forward/backward direction, the front side leg units 21A and 21B are controlled with the parameter [front legs z], and the rear side leg units 21C and 21D are controlled with the parameter [rear legs z].

Figure 7:
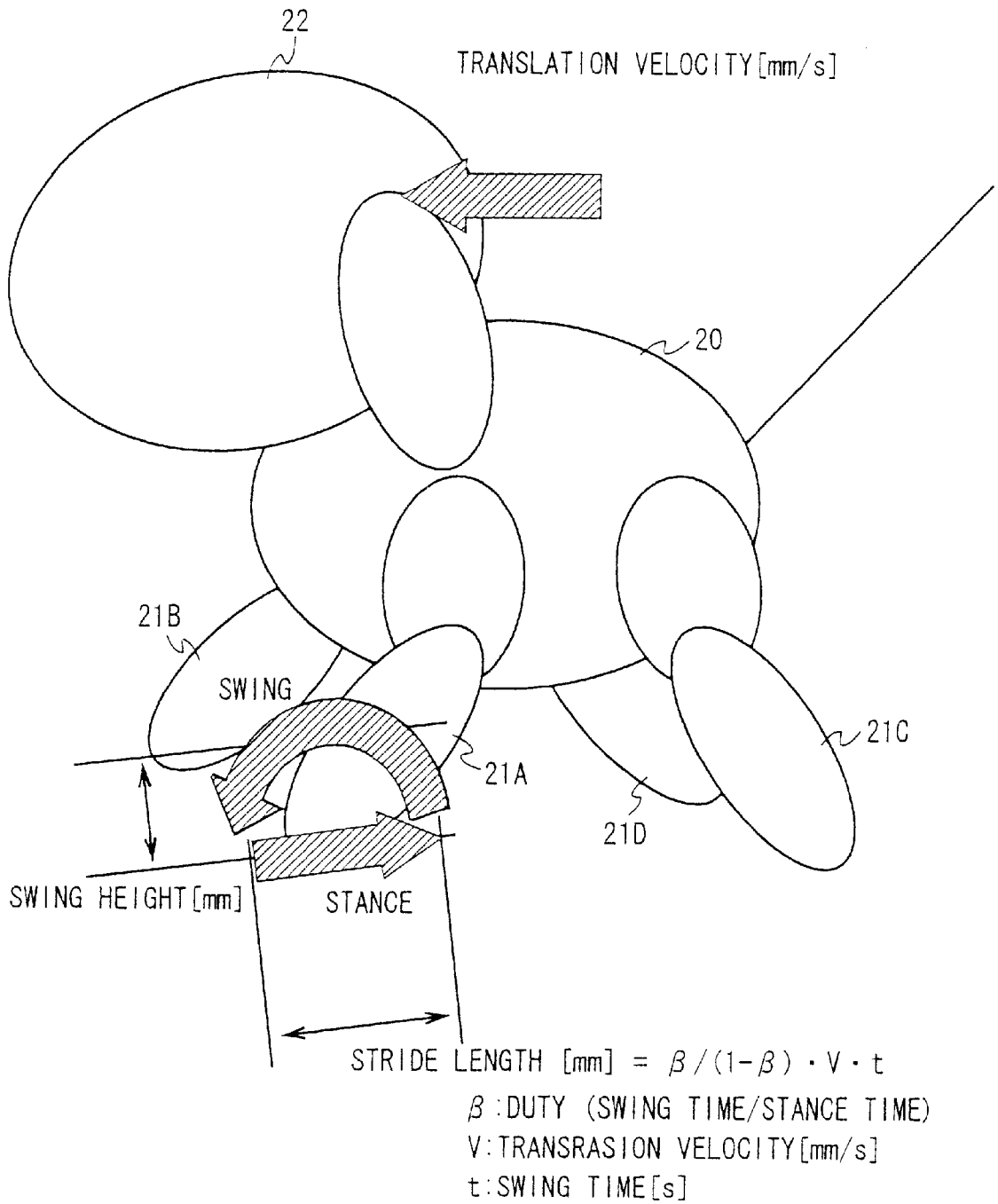
FIG. 7 is a schematic diagram utilized for explaining the movement of one leg unit.

On the other hand, the parameters for controlling the movements of the leg units 21A to 21D are as follows. FIG. 7 shows a simplified movement of one leg unit 21A (21B to 21D).

At first, the parameter for determining the step length of walking is designated as [step length]. Besides, the height and the time of a leg unit 21A (21B to 21D) that is raised at the time of floating the leg are respectively controlled with the parameters [swing height] and [swing time].

[Swing multi] is a parameter for giving the ratio of the grounding time and the floating time in one cycle of a leg, and the grounding time and the floating time of each leg unit 21A to 21D is controlled by this. In this connection, this parameter can be utilized as the parameter concerning how to raise each leg unit 21A to 21D at the time when the processing of transition from the crawl gait (gentle walking) to the trot gait (dynamic walking) or to the pace gait (dynamic walking) is performed on the basis of the different algorithm, for instance.

The stability and/or the speed of walking can be improved, by relatively adding the forward, backward, left and right translation or the turning motions of rolling, pitching and yawing, with respect to the body unit 20 of the robot 3, at the time of walking. These are respectively controlled by the parameters [ample body x], [ample body y], [ample body z], [ample roll], [ample pitch] and [ample yaw].

[Min. gain], [shift] and [length] are the parameters for determining the controlling related to the gain of PID control of the actuators 36A to 36n (servo motors) that are used for walking motion of the robot 3. By these parameters, for instance, such a soft PID gain is given that the shock is absorbed at the time of grounding, and such a possibility is given that a smooth walking can be realized. In practice, only P gain is controlled out of PID gain, on the basis of the following equation $$\text{gain} = g\min + (g\max - g\min) \times (1 - \sin(\text{leg\_phase-shift})) \quad (1)$$

Where, [leg phase] is that which has [shift, shift+length] as its range of values. That is, P gain changes from the value of [g min] to the value of [g max], depicting a sign curve, and its phase is that which becomes the maximum at the position that is given with the parameter [shift]. Where, [g max] is previously given; the phase is such that the leg is swung up in the forward direction at 0°, kicks the ground rearward at 180°, and returns to initial position at 360°.

Figure 8:
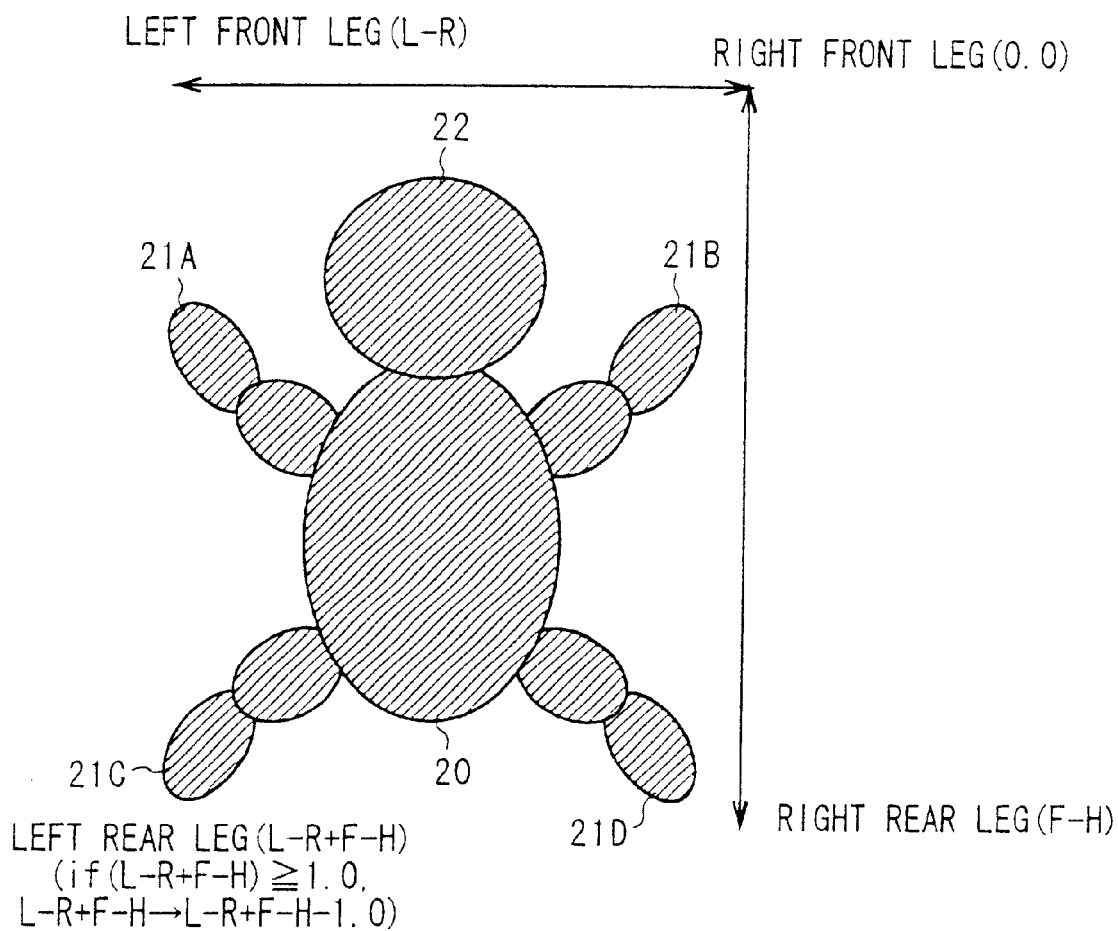
FIG. 8 is a schematic diagram utilized for explaining the parameters.
Figure 9:
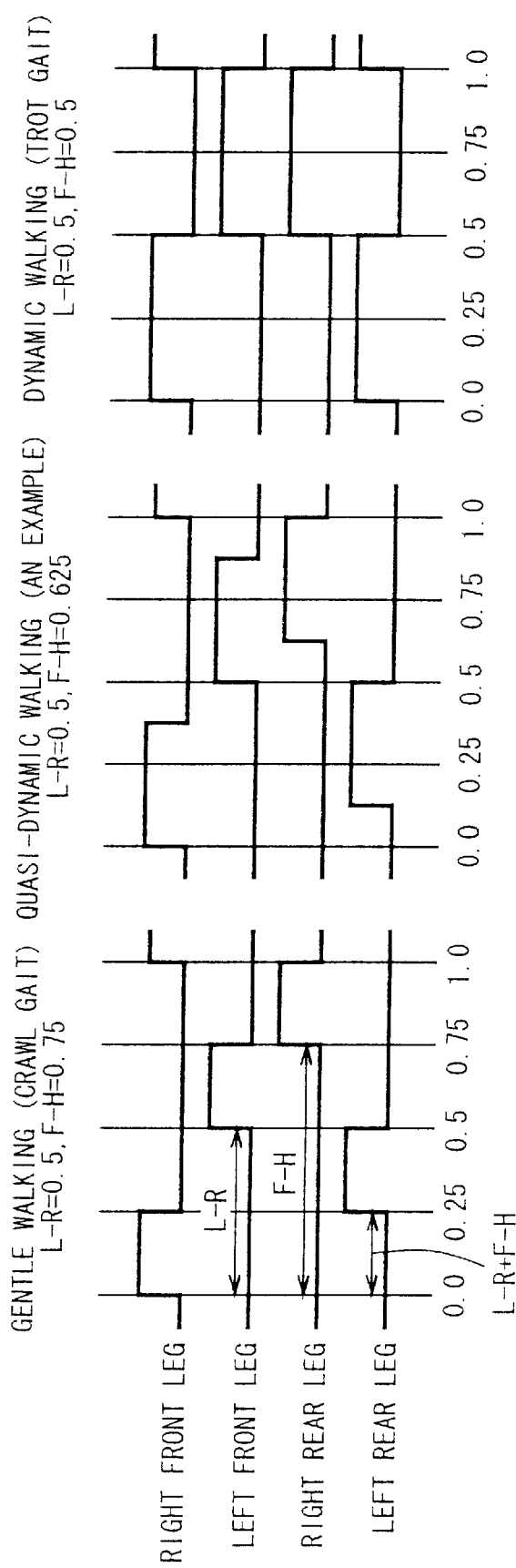
FIGS. 9A to 9C are timing charts showing the phase relation of the parameters in the various gaits.

As shown in FIG. 8 and FIG. 9, [L-R] and [F-H] are parameters that respectively give, on the basis of the right foreleg unit 21B, the ratios of the time duration from the time when the leg unit 21B has begun floating till the time when the left foreleg unit 21A or the right rear leg unit 21D have begun floating to one cycle of walking motion; for instance, the case of gentle walking (crawl gait) applies FIG. 9A, the case of quasi-dynamic walking applies FIG. 9B, and the case of dynamic walking (trot gait) applies FIG. 9C.

(2-2-2) Algorithm of Parameter Evolution

Next, how to cause the various parameters for walking control in the robot 3 to evolve is explained.

In this robot 3, the controller 30 (FIG. 4) performs the processing for parameter evolution by the use of genetic algorithm. This embodiment has adopted a method for evolution that is called [steady state GA] wherein the number of individuals of each generation is maintained steadily, as the genetic algorithm. Besides, real value encoding has been adopted as the gene type, and the above-mentioned twenty-two parameters are used as the gene types just as it is.

Figure 10:
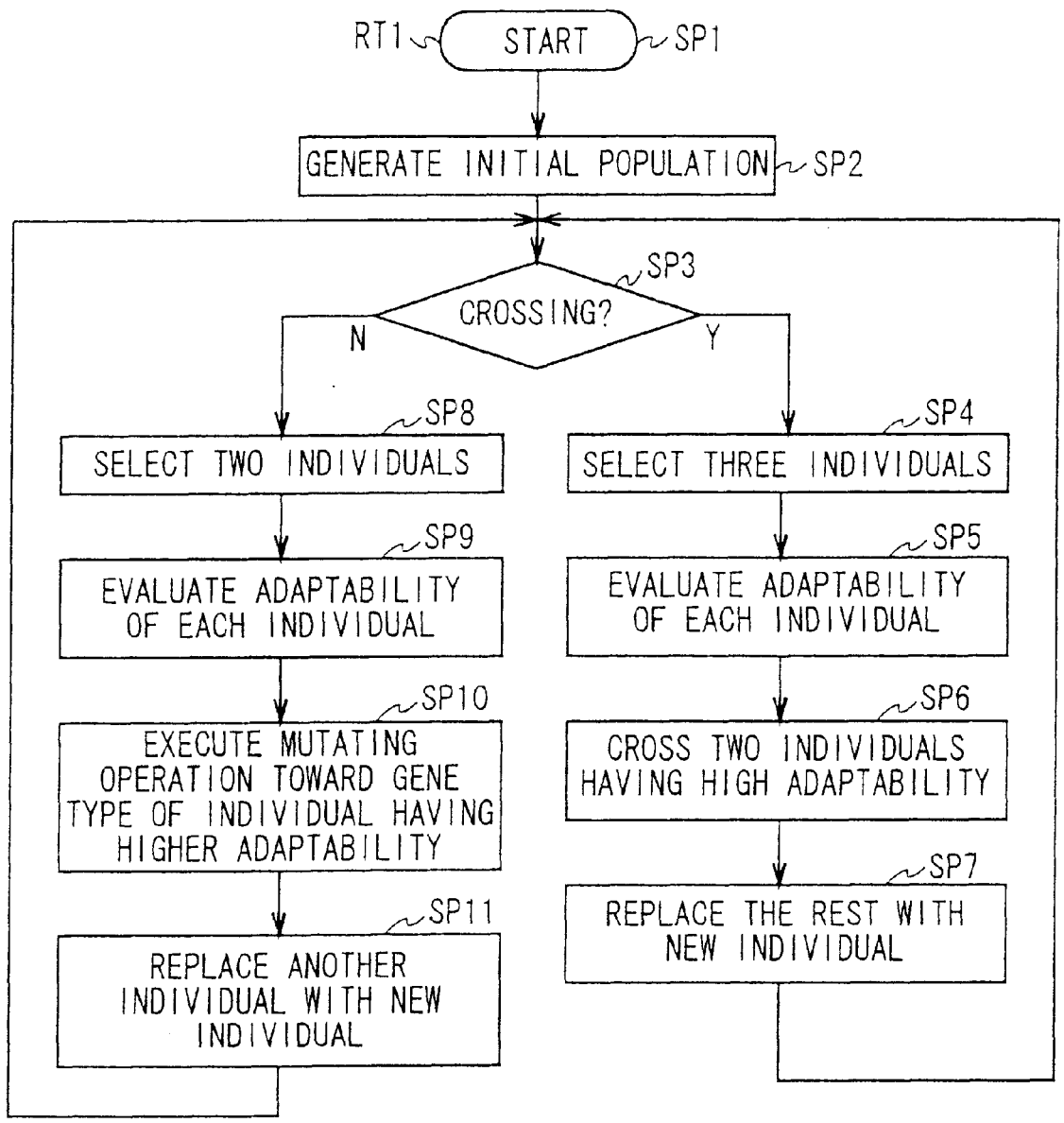
FIG. 10 is a flow chart showing the parameter evolution procedure.

And, the controller 30 performs the genetic algorithm processing for parameter evolution, in accordance with the parameter evolution procedure RT1 shown in FIG. 10. That is, the controller 30 starts this parameter evolution procedure RT1 at the step SP1, and then selects the stated number (for instance, thirty) of individuals (each of which is one walking pattern that is prescribed by the 22 parameters) at random, at the following step SP2, thereby generating the initial population.

In this case, each gene type (parameter) of each individual is selected at random within the range of, for instance, 5% whose center is the central value of the retrieval range ([initial range] in FIG. 5). In this connection, the retrieval ranges of the respective parameters in FIG. 5 have been set as the experimental values.

However, most of the individuals that have been selected at random in this manner are that which the robot 3 falls down in a short time or it is not able to go forward. By this reason, every time one individual has been generated, the controller 30 performs its evaluation, causing the robot 3 to actually walk on the basis of the very individual; if the robot 3 has been not able to normally walk on the basis of the very individual, then the controller 30 selects the other individual anew, and collects the stated number of individuals that can enable the robot 3 to advance even a bit, thereby generating a population of individuals.

The controller 30 then goes to the step SP3, and starts the processing for parameter evolution based on the genetic algorithm. At here, in this embodiment, crossing of individuals and generation of mutation are performed in parallel with each other as the genetic algorithm processing. So, on the step SP3, this controller 30 selects whether cross is performed at first or mutation is performed, with a certain probability (even probability, in this embodiment).

If crossing has been selected, the controller 30 then goes to the step SP4 and selects three individuals out of the population at random, and, on the following step SP5, causes the robot 3 to walk actually as stated hereinafter, with respect to these selected three individuals, and evaluates the adaptability of each individual with respect to velocity and straightness.

The controller 30 then goes to the step SP6, selects two individuals that have high adaptability out of those three individuals, on the basis of the evaluations of the respective individuals obtained on the step SP5, and then crosses the selected two individuals so as to generate new individual.

To be more concrete, the controller 30 determines $c_i$ so as to generate a new individual, by the following equation $$c_i = p1_i + \sigma_i(p1_i - p2_j) \quad (2)$$

where, the i-th gene type (parameter) of the selected two individuals (designated as p1, p2) are respectively designated as $p1_i$ and $p2_i$, the i-th gene type of the new individual that is generated by crossing is designated as $c_i$, and a value of the uniform random numbers of the range −1–1 that have been generated toward $c_i$ is designated as $\sigma_i$.

The controller 30 then goes to the step SP7, replaces the individual whose adaptability on the step SP5 has been the lowest among the three individuals that have been selected on the step SP4, with the new individual that has been generated on the step SP6, and then returns to the step SP3.

On the other hand, when mutation has been selected on the step SP3, the controller 30 goes to the step SP8, and selects two individuals from the population at random; on the following step SP9, the controller 30 causes the robot 3 to actually walk and hereby evaluates the adaptability of each individual with respect to speed and straightness, as with the step SP5.

The controller 30 then goes to the step SP10, selects an individual that has higher adaptability out of these two individuals, on the basis of the evaluations of the respective individuals obtained on the step SP9, and executes mutating operation toward the gene types of the very individual.

To be more concrete, the controller 30 selects 1 to 8 gene types at random out of 22 gene types (parameters) of the individual that has been selected on the step SP10, and determines $c_i$ so as to generate a new individual, by the following equation $$c_i = p_i \delta_{i(mutate)} \quad (3)$$

where, the i-th gene type out of these selected gene types is designated as $p1_i$, the i-th gene type of the new individual that is generated by mutation is designated as $c_i$, and a value of the uniform random numbers of the range −1–1 that have been generated toward $c_i$ is designated as $\delta_{i(mutate)}$.

The controller 30 then goes to the step SP11, replaces the individual whose adaptability on the step SP9 has been the lower among the two individuals that have been selected on the step SP8, with the new individual that has been generated on the step SP10, and then returns to the step SP3.

Figure 11:
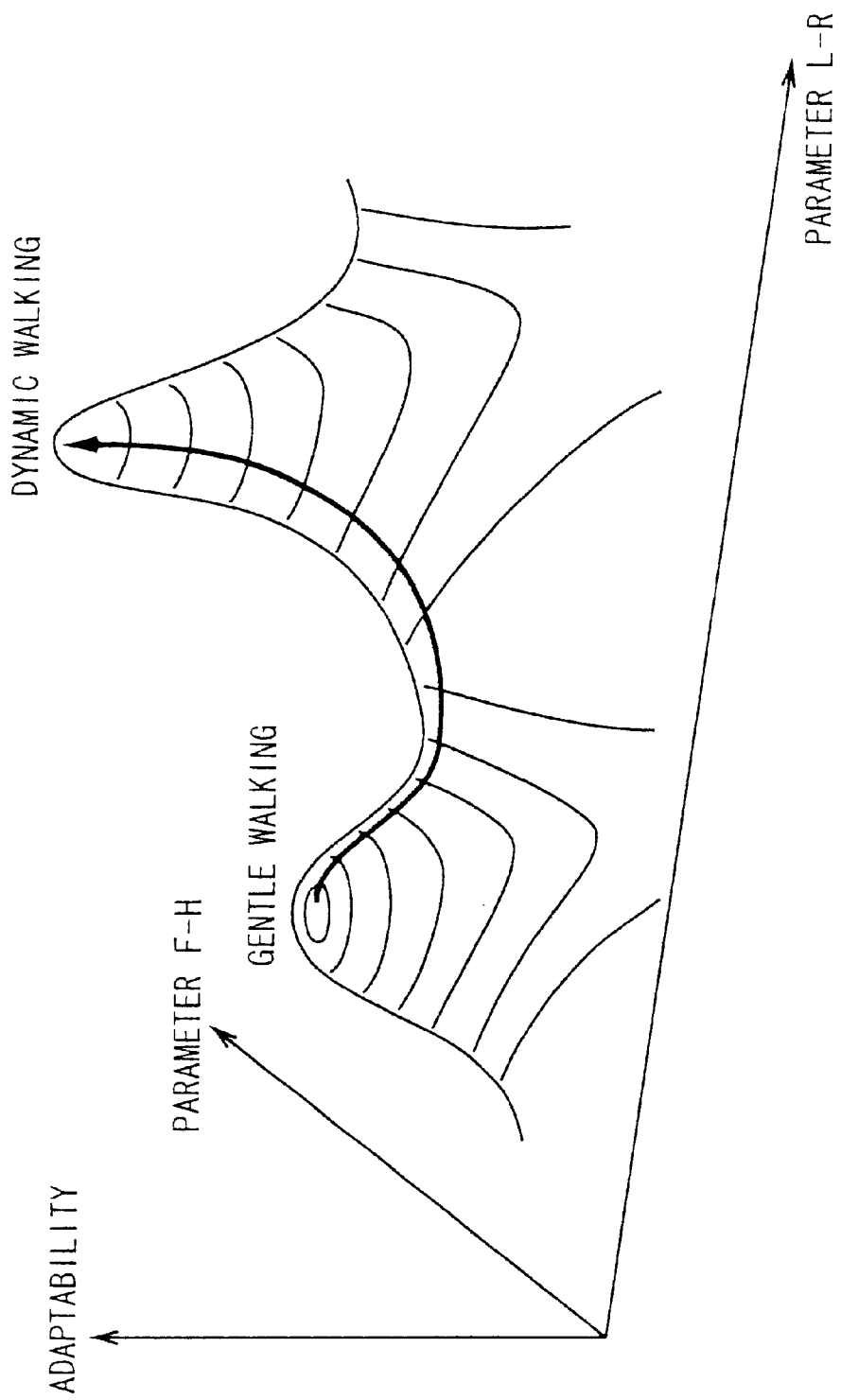
FIG. 11 is a schematic diagram showing the state of changing from the gentle walking to the dynamic walking.

And, the controller 30 repeats the similar processings many times after this, selecting the crossing operation or the mutating operation at random. As the result of this, the population of individuals gradually becomes a gathering of the stated number (30) of individuals that have high adaptabilities. As an example, FIG. 11 shows such an aspect that the walking pattern gradually changes from the gait of gentle walking to the gait of dynamic walking owing to evolution of the parameters [L–R] and [F–H].

Therefore, in the robot developing environment system 1, by causing the robot 3 to perform crossing or mutating operations like this by the desired times, and by selecting an individual that has the highest adaptability out of thirty individuals obtained in this way, the parameter values of twenty-two parameters for walking control that has excellent velocity and straightness can be obtained.

(2-2-3) Evaluating Procedure of Adaptability of Individual

Figure 12:
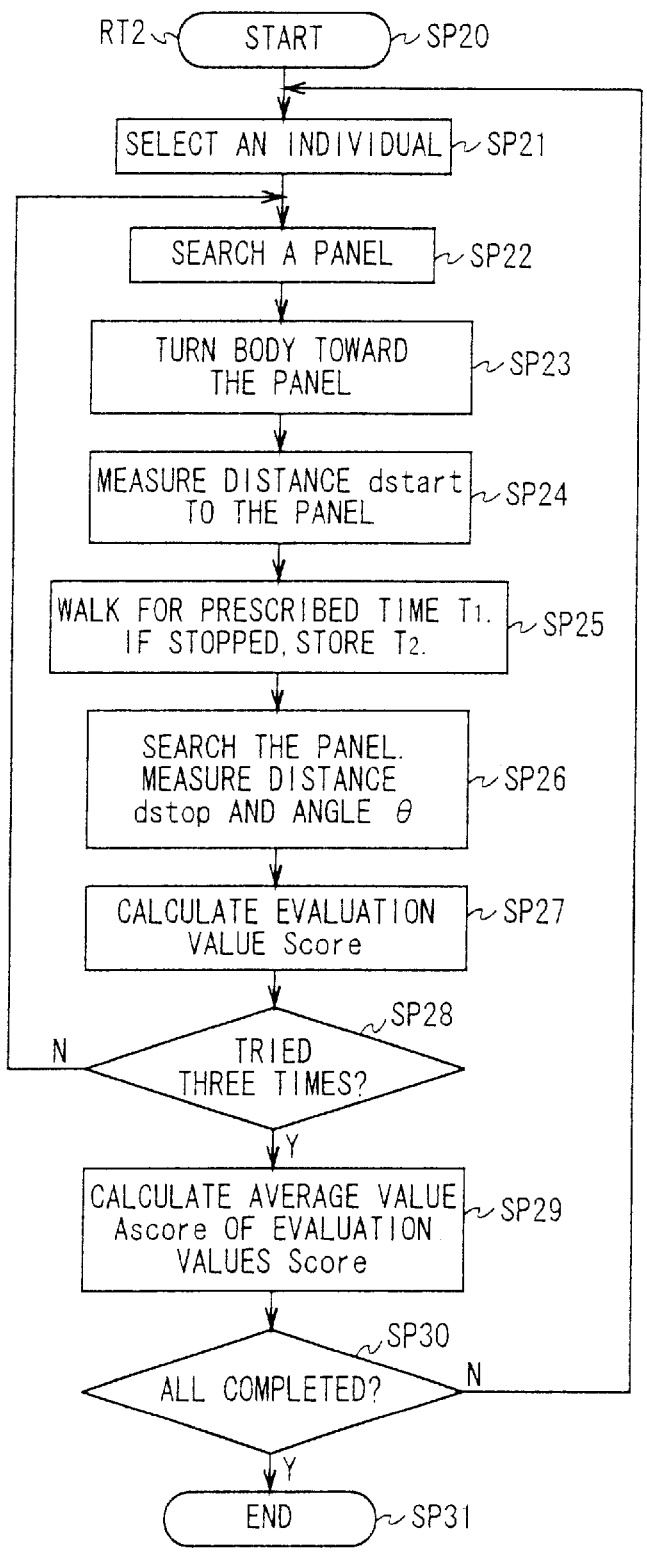
FIG. 12 is a flow chart showing the adaptability evaluation procedure according to the first embodiment.

At here, the controller 30 performs evaluation of adaptability of each individual on the step SP5 and the step SP9 of the parameter evolution procedure RT1, in accordance with the adaptability evaluation procedure RT2 shown in FIG. 12.

That is, upon transferring to either the step SP5 or the step SP9 of the parameter evolution procedure RT1, the controller 30 starts this adaptability evaluation procedure RT2 on the step SP20; on the following step SP21, the controller 30 selects one individual out of three or two individuals that have been selected on the step SP4 or the step SP8 of the parameter evolution procedure RT1 (FIG. 10), and adopts the respective parameters of the very individual as the parameters for walking control.

On the following step SP22, the controller 30 causes the robot 3 to search any one panel 13A in the environment unit 2 (FIG. 2), by causing the head unit 22 of the robot 3 to turn in yaw direction, driving the respective leg units 21A to 21D, as necessary, and hereby causing the body unit 20 to turn in yaw direction at the place.

When the controller 30 has detected one panel 13A through this searching, the controller 30 goes to the step SP23, and causes the body unit 20 to turn in yaw direction so that the position of the very panel 13A becomes the front, by driving the respective leg units 21A to 21D.

Next, the controller 30 goes to the step SP24, measures the distance $d_{start}$ to the panel 13A on the basis of distance measurement signal S4 obtained from the distance sensor 35 (FIG. 4) and stores this; at the following step SP25, the controller 30 drives the respective leg units 21A to 21D, and hereby causes the robot 3 to walk toward the panel 13A for the stated prescribe d time $T_1$ (for instance, 7 seconds).

At this time, the controller 30 always monitors the distance to the frontal wall 12A on the basis of the distance measurement signal S4 from the distance sensor 35, and, when the very distance has become less than the previously set stated distance, stops the robot 3 to walking, and stores the time $T_2$ of walking in this trial.

When the robot 3 has stopped the walking motion, the controller 30 goes to the step SP26, causes only the head unit 22 of the robot 3 to turn in yaw direction, so as to search the objective panel 13A.

Figure 13:
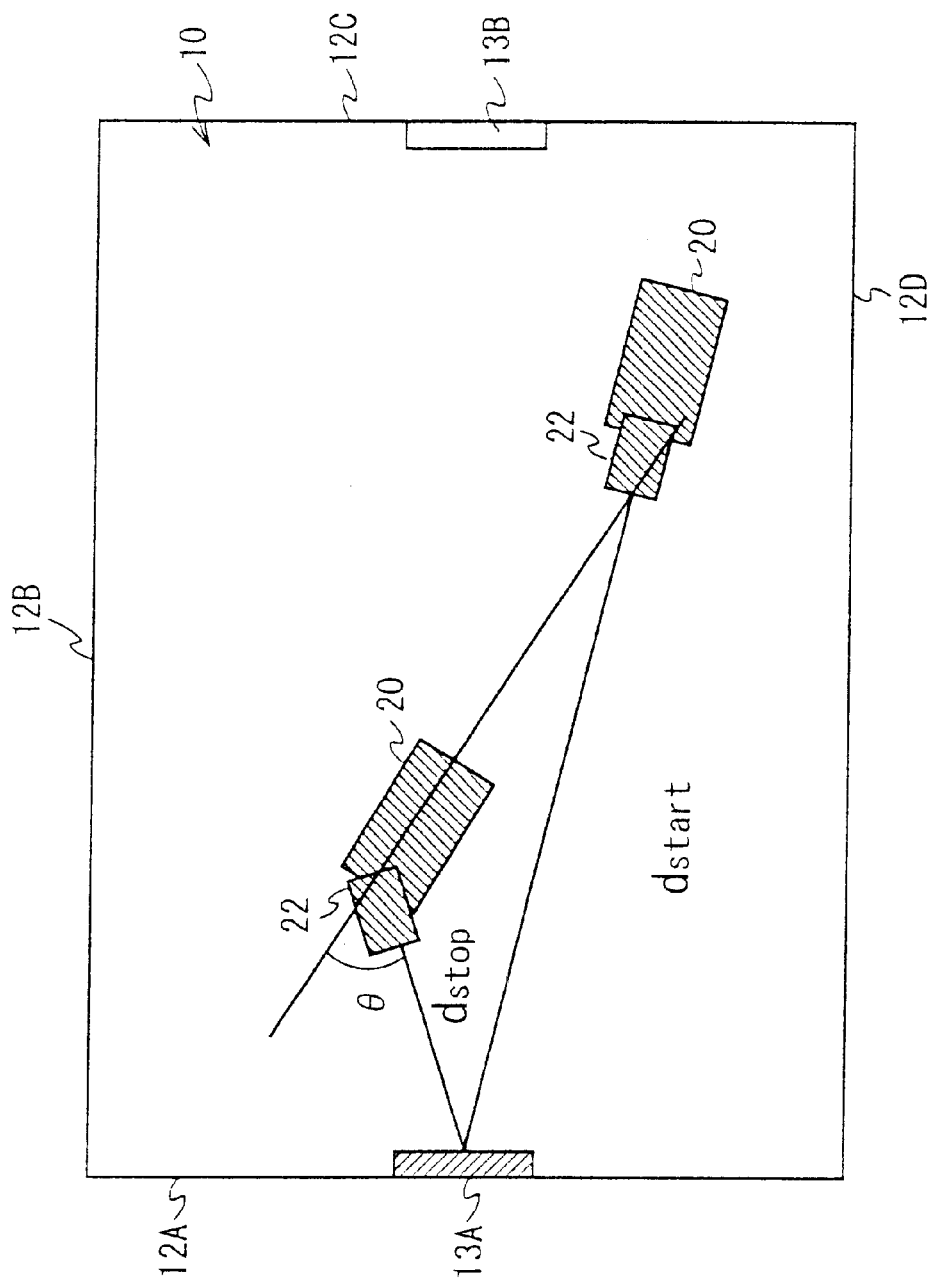
FIG. 13 is a schematic diagram utilized for explaining how to evaluate an individual.

When this panel 13 has been detected, the controller 30 measures the distance $d_{stop}$ to the very panel 13A on the basis of the distance measurement signal S4 obtained from the distance sensor 35 (FIG. 4), and also measures the angle θ that is defined by the front-rear axis of the body unit 20 and the direction to the panel 13A, on the basis of the direction of the head unit 22 that is obtained on the basis of the angle detection signal S5A given from the potentiometer 37A which is corresponding to the actuator 36A for turning the head unit 22 in yaw direction, as shown in FIG. 13.

On the following step SP27, the controller 30 calculates the evaluation value $S_{core}$ of the individual with respect to speed and straightness, on the basis of the distance $d_{stop}$ and the angle θ that has been obtained on the step SP26.

To be more concrete, the controller 30 calculates the velocity of the robot 3, using an evaluation function v ($d_{start}$, $d_{stop}$, T) that is obtained based on the following equation $$\text{Score} = v(d_{start}, d_{stop}, T) \times s(\theta, d_{stop}) \quad (4)$$

and also calculates the straightness, using an evaluation function s (θ, $d_{stop}$) that is obtained based on the following equation $$v(d_{start}, d_{stop}, T) = \frac{d_{start} - d_{stop}}{T} \quad (5)$$

then, the controller 30 performs multiplication of thus obtained values, on the basis of the following equation $$s(\theta, d_{stop}) = \frac{d_{stop}(f(\theta) - 1) + 80 - 10f(\theta)}{70} \qquad (6)$$

and hereby calculates the evaluation value of the individual $S_{core}$.

Where, T in the equations (4) and (5) should be $T_1$ in the case where the robot 3 has been able to walk for the prescribed time, or $T_2$ in the case where the robot 3 has stopped walking. Besides, f ($\theta$) in the equation (6) is an auxiliary function for evaluating the straightness, and, in the case of this embodiment, it is obtained by the use of the following equation $$f(\theta) = 1 - \frac{|\theta|}{90°} \qquad (7)$$

Besides, the constant 80 and the constant 10 that are contained in the equation (6) are respectively the measurable maximum distance and the minimum distance (the units are centimeter) of the distance sensor 35 mounted on the robot.

On the following step SP28, the controller 30 judges whether the trials have been performed three times in total with respect to the identical individual or not, and, if the negative result has been obtained, returns to the step SP22; after this, sequentially changing the objective panels 13A and 13B by turns, the controller 30 repeats such processing on the step SP22–the step SP28.

When the trials have been executed three times in total with respect to the identical individual by and by and hereby the affirmative result has been obtained, the controller 30 goes to the step SP29, and calculates the average value $A_{score}$ of three evaluation values $S_{core}$ that have been obtained through the trials of three times. This average value $A_{core}$ represents the adaptability of the very individual related to velocity and straightness.

Next, the controller 30 goes to the step SP30, and judges whether such processing has been completed with respect to all of the individuals that have been selected on the step SP4 or the step SP8 of the parameter evolution procedure RT1 or not; if the negative result has been obtained, it returns to the step SP21, and then processes the step SP22–the step SP30 in the same manner.

When the same processing has been completed with respect to all individuals by and by and hereby the affirmative result has been obtained on the step SP30, the controller 30 goes to the step SP31 and ends this adaptability evaluation procedure RT2, and returns to the parameter evolution procedure RT1 (FIG. 10), and then goes to the step SP6 or the step SP10 of the parameter evolution procedure RT1.

(2-3) Operation and Effect of the Present Embodiment

In the above-mentioned configuration, the controller 30 of the robot 3 generates a population by generating the stated number of individuals, each of which is comprised of 22 parameters for performing walking control, causes the robot 3 to walk actually, and evaluates the adaptabilities of these individuals with respect to velocity and straightness, and also evolves these individuals in accordance with genetic algorithm on the basis of the very evaluation results.

Therefore, according to the robot developing environment system 1, it is possible to easily obtain the parameter values (walking patterns) that have excellent velocity and straightness as the parameter values of the various parameters for walking control, without requirement of a high order of expertise or operations such as repetitive simulations with a personal computer.

Besides, according to this robot developing environment system 1, it is possible to significantly easily obtain the optimum parameter values that can be directly applied to the products without taking into account the margin of error between the actual robot 3 and the robot in the simulation or the difference of such as the dynamic characteristics in each robot, because the evaluation is performed per individual using the actual robot 3, as compared to the conventional method in which appropriate parameters are obtained by the simulation.

Besides, in this robot developing environment system 1, the robot 3 automatically searches each panel 13A, 13B of the environment unit 2, and walks toward the detected panel 13A, 13B, therefore, the user is not required to return the robot 3 to the original position or to change the orientation of the robot 3 for each trial (walking), and so it is possible to make the walking-pattern generating work easier correspondingly.

Besides, in this robot developing environment system 1, the parameters ([L–R] and [F–H] of FIG. 5) that prescribe the driving phase of each leg unit 21A to 21D of the robot 3 are also evolved; therefore, it is possible to easily detect the gaits of dynamic walking (a trot gait, a pace gait, and others) that is most suited for the hardware of the robot 3 and/or the walking road surface.

According to the above-mentioned configuration, a population is generated by generating plural individuals, each of the individuals is comprised of plural parameters for performing walking control, the robot 3 is caused to walk actually and the adaptabilities of these respective individuals are evaluated with respect to velocity and straightness, at the same time, these individuals are evolved in accordance with genetic algorithm on the basis of the very evaluation results; therefore, it is possible to easily obtain the excellent parameter values as the parameter values of the various parameters for walking control, without requirement of a high order of expertise and/or a complicated work, and so it is possible to make the walking-pattern generating work easy.

Figure 14:
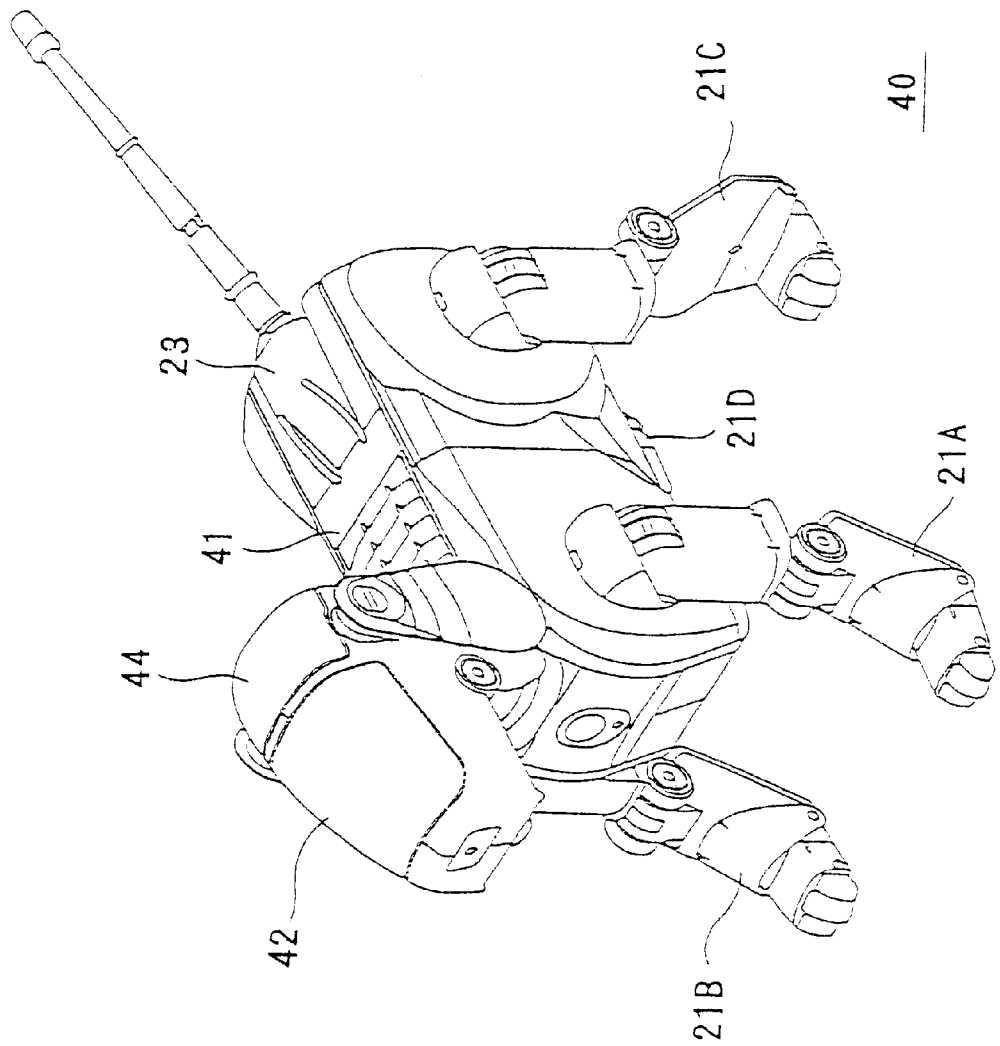
FIG. 14 is a perspective view showing the external appearance of a robot according to the second embodiment.
Figure 15:
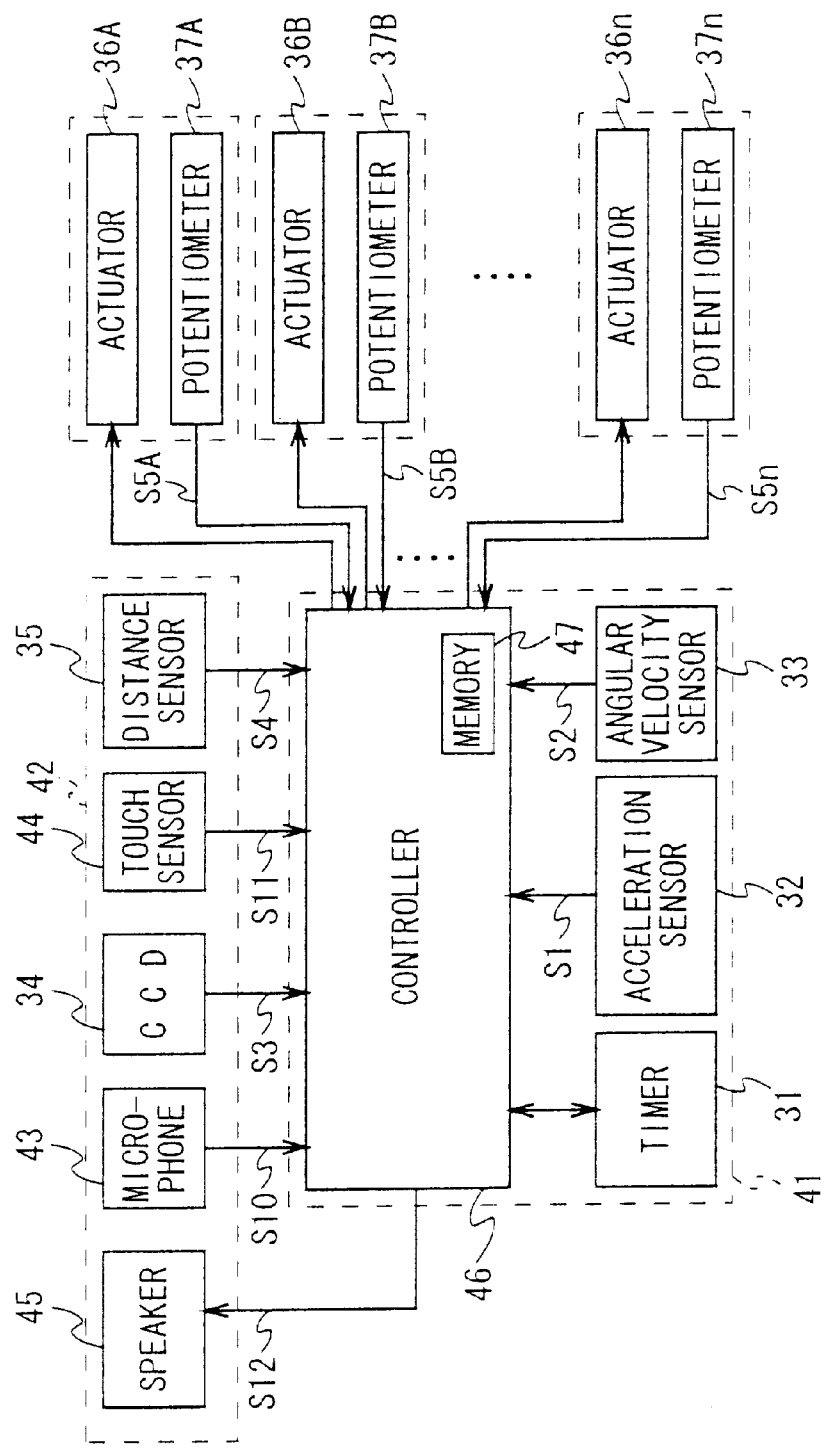
FIG. 15 is a block diagram showing an internal configuration of a robot according to the second embodiment.

(3) Second Embodiment (3-1) Configuration of a Robot according to the Present Embodiment FIGS. 14 and 15, which have the same reference numerals as those of FIGS. 3 and 4 on their portions that are corresponding to the portions of FIGS. 3 and 4, illustrate a robot 40 according to the second embodiment; the configuration of the hardware of it is nearly the same as that of the robot 3 of the first embodiment, except that a microphone 43, a touch sensor 44 and a speaker 45 are respectively installed on the stated positions of the head unit 42.

In this case, the microphone 43 collects the command sounds such as [Walk], [Lie down] and [After the ball] that would be given from the user via a sound commander, not shown, as the musical scale, and sends the obtained voice signal S10 to a controller 46 that is contained in a body unit 41.

The touch sensor 44 is installed on the upside of the head unit 42, as shown in FIG. 14, and detects a pressure that would be applied from the user by his physical action such as [patting on] and [slapping on], and then sends the result of the detection to the controller 46 as a pressure detection signal S11.

The controller 46 judges the posture and the state of the robot 40, as well as the surrounding situations, and also judges whether there is any command or any action from the user, on the basis of the voice signal S10, the image signal S3, the pressure detection signal S11, the distance measurement signal S4, the acceleration detection signal S1, the angular velocity detection signal S2, and the angle detection signal S5A to S5n, which are supplied from the microphone 43, the CCD camera 34, the touch sensor 44, the distance sensor 35, the acceleration censor 32, the angular velocity sensor 33, and the respective potentiometers 37A to 37n, respectively.

And, the controller 46 decides the following action, on the basis of the result of this judgement and the program that has been previously stored in a memory 47; by driving the necessary actuators 36A to 36n on the basis of the result of the decision, the controller 46 would cause the head unit 42 to swing upwards, downwards, rightwards and leftwards, and/or drive the respective leg units 21A to 21D so as to cause to walk.

Besides, at this time, the controller 46 gives the stated voice signal S12 to the speaker 45 so as to output the voice that is based on the very voice signal S12 to the exterior, and causes light emitting diodes (LEDs) that are not shown but installed on the [eye] positions of this robot to go on, to go out, and to blink, as necessary.

In this manner, this robot is enabled to act on an autonomous basis, responding to the situation of the circumference, and to the posture and the state of himself.

In addition to such a configuration, in the case of this robot 40, the controller 46 is composed so as to gradually evolve the various parameters for walking control by the genetic algorithm, and hereby gradually accommodate the walking pattern to the state of the walking road surface (flooring board, carpet, or rush mat).

That is, in the case of this robot 40, the gene types of the individual that has the highest adaptability of velocity and straightness which has been obtained in the same way as the above-mentioned first embodiment have been previously set as the initial values of the various parameters for walking control. And, the controller 46 performs walking control of the robot 40 by controlling the corresponding actuators on the basis of these set parameters, at the initial time.

Besides, the controller 46 generates the stated number of additional individuals with the appropriate timing, in the same way as the case of the step SP2 of the above-mentioned parameter evolution procedure RT1 (FIG. 10), to generate a population of individuals (including the individuals of the initial setting), and also causes each individual that composes the very population to evolve, through the processing that is similar to the step SP3 to the step SP11 of the parameter evolution procedure RT1.

While performing processing like this, the controller 46 selects the individual that has the highest adaptability out of the individuals which compose the population, each time it performs crossing operation or mutating operation, and sets the respective gene types (parameters) of the very selected individual as the parameter values of the various parameters for walking control.

By this, in this robot 40, parameter values having high adaptabilities are always set as 22 parameters for walking control, therefore, it is possible to gradually accommodate the walking pattern to the state of the walking road surface, as each individual of the population evolves.

Figure 16:
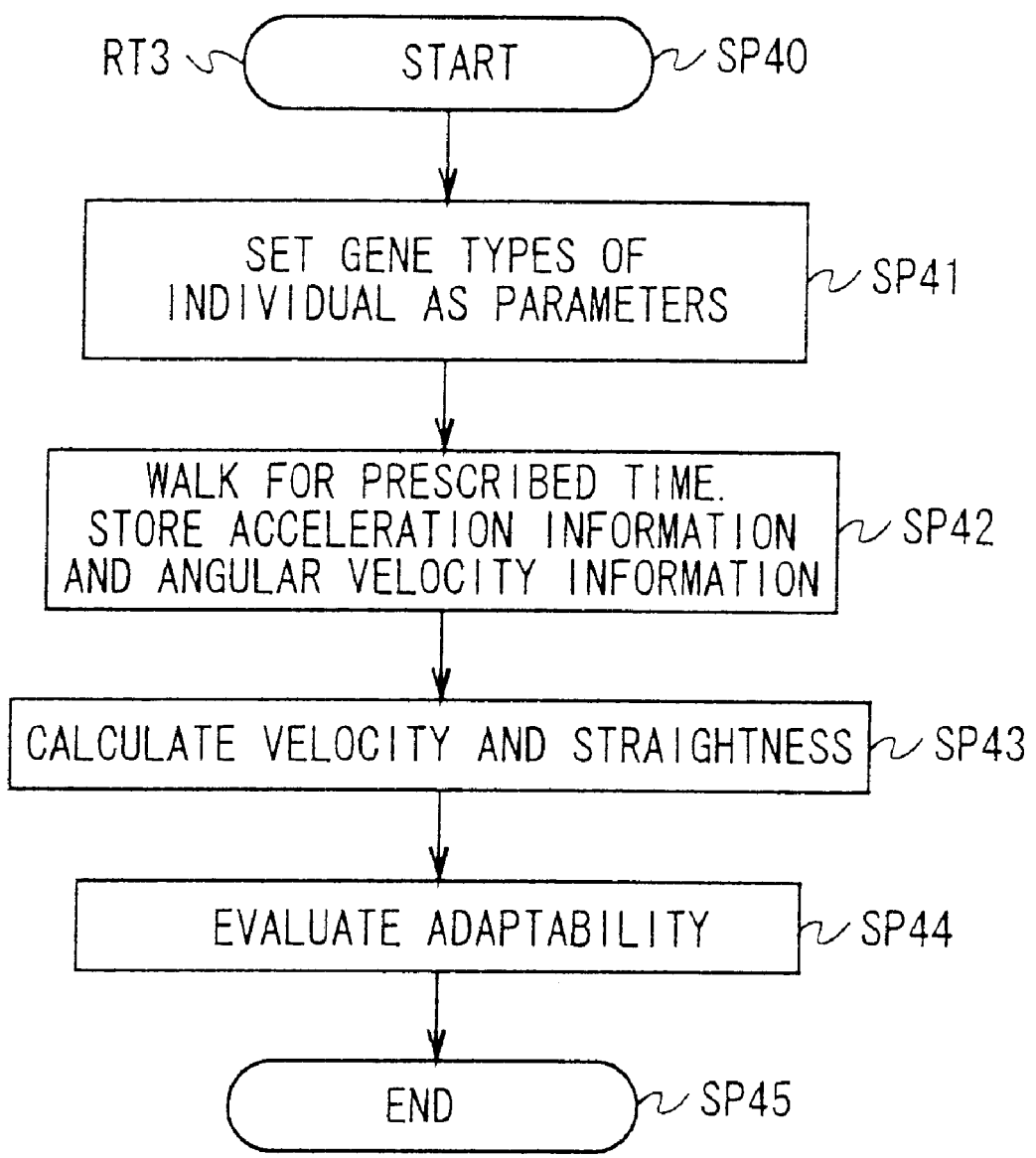
FIG. 16 is a flow chart showing the adaptability evaluation procedure according to the second embodiment.

In the case of this robot 40, the controller 46 would evaluate the adaptability of each individual, in accordance with an adaptability evaluation procedure RT3 shown in FIG. 16.

Upon selecting the individual that is the object of evaluation, the controller 46 starts this adaptability evaluation procedure on the step SP40, and sets each gene type (parameter) of the very individual as the parameter value of each parameter for walking control, on the following step SP41.

The controller 46 then goes to the step SP42, and walks for the prescribed time with the walking pattern that is prescribed by these parameter values, and also stores the acceleration information (updated for each tens millisecond, as stated above) that is obtained based on the acceleration detection signal S1 which is given from the acceleration censor 32 (FIG. 15) at this time, as well as the angular velocity information (updated for each tens millisecond, as stated above) that is obtained based on the angular velocity detection signal S2 which is given from the angular velocity sensor 33 (FIG. 15) in the memory 47 (FIG. 15), sequentially.

When walking of the prescribed time has been completed in this manner, the controller 46 goes to the step SP43, and reads the acceleration information and the angular velocity information that have been stored in the memory 47; then it calculates the velocity in this trial by executing the integration operation of the read acceleration information, and also calculates the lateral movement distance (corresponds to the straightness) in this trial by executing the integration operation of the angular velocity information.

On the following step SP44, the controller 46 executes multiplication of the velocity and the lateral movement distance that have been calculated on the step SP43 and hereby calculates the evaluation value related to the velocity and the straightness of the individual, and then stores this evaluation value in the memory 47 as the adaptability of this individual; then it goes to the step SP45, and ends this adaptability evaluation procedure RT3.

(3-2) Operation and Effect of the Present Embodiment

In the above-mentioned configuration, the controller 46 of the robot 40 generates a population by generating plural number of individuals, each of the individuals is comprised of plural parameters for performing walking control, causes the robot 40 to walk actually, and evaluates the adaptabilities of these individuals with respect to velocity and straightness, and also evolves these individuals in accordance with genetic algorithm on the basis of the very evaluation results. Besides, at this time, the controller 46 would control the walking, utilizing each gene type (parameter) of the individual that has the highest adaptability among the population.

Therefore, this robot 40 is able to adapt the walking pattern to the state of the walking road surface and to perform walking always with a walking pattern that has an excellent velocity and straightness, without requirement of a complicated work such as previous assumption of the various states of the walking road surface and preparation of walking pattern for each state.

According to the above-mentioned configuration, a population is generated by generating plural individuals, each of the individuals is comprised of plural parameters for performing walking control, the robot 3 is caused to walk actually and the adaptabilities of these respective individuals are evaluated with respect to velocity and straightness, at the same time, these individuals are evolved in accordance with genetic algorithm on the basis of the very evaluation results; therefore, the walking can be always performed with a walking pattern that is suited for the state of the walking road surface. Thus, at the time of development, a complicated work such as previous assumption of the various states of the walking road surface and preparation of walking pattern for each state is not required, and so it is possible to make the walking-pattern generating work easy.

Furthermore, according to the above-mentioned configuration, processing of obtaining the optimum parameter is accomplished only by the robot 40 because the optimum parameter is obtained using the actual robot. In this way, when, for example, this robot is sold as a product, the walking pattern of the robot 40 can be automatically changed to an optimum walking pattern depending on the situation in which it is used (such as the shape of the floor of the user's house), thereby preventing the robot 40 from making awkward movements caused by the walking pattern of the robot 40 that does not fit for the using situation, realizing a robot rich in variety best suited for the user and thus providing improved amusement of the robot 40.

(4) Other Embodiments

In the above-mentioned first and second embodiments, such cases have been described that the present invention has been applied to the quadruped-type robots 3 and 40, however, we do not intend to limit the present invention to such; the present invention can be applied to walking-type robots of the wide variety of configurations other than a four-footed type.

Besides, in the above-mentioned first and second embodiments, such cases have been described that the servo motors have been adopted as the driving means (actuators 36A to 36n) for driving the respective leg units 21A to 21D of the robots 3 and 40, however, we do not intend to limit the present invention to such; other wide variety of actuators can be adopted.

In addition, in the above-mentioned first and second embodiments, such configurations have been described that the controlling means for controlling the actuators 36A to 36n on the basis of the parameters for controlling the walking of the robot 3, 40, the evaluating means for evaluating the walking, and the parameter updating means for updating the parameters for walking control so that the evaluation of the walking by the evaluating means is enhanced are integrated into one controller 30, 46; however, we do not intend to limit the present invention to such; these means can be separated and provided individually.

Besides, in the above-mentioned first and second embodiments, such cases have been described that 22 parameters shown in FIG. 5 have been adopted as the parameters for walking control that are to be evolved by the genetic algorithm, however, we do not intend to limit the present invention to such; a part of these or the other parameters other than these can be evolved.

In addition, in the above-mentioned first and second embodiments, such cases have been described that the evaluation standard of the time when the various parameters for walking control are evolved is the velocity and the straightness, however, we do not intend to limit the present invention to such; in addition to these, or other new evaluation standard can be provided.

In this connection, as such a new evaluation standard, the degree of resistance to moving of the image that is based on the image signal S3 obtained from the CCD camera 34 can be adopted, for instance. As to the evaluating method, such a method can be adopted that the total sum of the brightness values of the respective picture elements in the image based on the image signal S3 obtained from the CCD camera 34 is calculated for each frame, and the differences of the brightness values among the respective frames are respectively calculated, and the evaluation is done such that the smaller the total sum of the very difference, the less the moving of the image.

Besides, in the above-mentioned first embodiment, such a case has been described that the poles 11A and 11B have been adopted as the obstructions of the time of walking of the robot 3 in the environment unit 2 of the robot developing environment system 1, however, we do not intend to limit the present invention to such; other wide variety of obstructions can be adopted.

Besides, in addition to this or in place of this, rugged portions and so on can be provided on the floor surface 10 of the environment unit 2 so that the walking road surface of the robot 3 becomes an irregular ground; by this, a walking pattern that enables to perform the stable walking even on the irregular ground can be obtained.

Besides, in the above-mentioned first embodiment, such a case has been described that the colored panels 13A and 13B have been adopted as the target of the time when the robot 3 in the environment unit 2 of the robot developing environment system 1 walks, however, we do not intend to limit the present invention to such; alternatively, other matters can be provided as the target of the time when the robot 3 walks.

Besides, in the above-mentioned first and second embodiments, such cases have been described that the various parameters for controlling the walking of the robots 3 and 40 are evolved on the basis of the genetic algorithm, however, we do not intend to limit the present invention to such; alternatively, these parameters can be evolved employing other algorithm.

Furthermore, in the above-mentioned embodiment, such cases have been described that the present invention is applied to a case of producing a walking pattern, however, we do not intend to limit the present invention to such; it can be widely applied to all kinds of movements or behavioral patterns such as brachiation movement or dances.

As described above, according to the present invention, a walking-type robot device is provided with a controlling means for controlling it so that the walking is performed in response to the parameters for controlling the walking, an evaluating means for evaluating the walking, and a parameter updating means for updating the parameters so that the evaluation of the walking by the evaluating means is enhanced; therefore, it is possible to obtain a walking pattern having a high evaluation, without requirement of a high order of expertise and/or a complicated work, in this way, it is possible to realize a robot device that can make the walking pattern generating work easy.

Besides, according to the present invention, a walking-type robot device is provided with a controlling means for controlling the robot so as to cause it to perform walking that accords with parameters which prescribe the driving phase of each leg of the time of walking; an evaluating means for evaluating the velocity of the walking; and a parameter updating means for updating the parameters so that the evaluation of the walking by the evaluating means is enhanced; therefore, it is possible to easily detect a gait that is most suited for the conditions such as the hardware of the very robot device, as the gait of the time of dynamic walking, in this way, it is possible to realize a robot device that can make the walking pattern generating work easy.

In addition, according to the present invention, a learning method of a walking-type robot device is provided with: a first step of causing the robot device to perform walking that accords with the parameters for controlling the walking; a second step of evaluating the walking; and a third step of updating the parameters so that the evaluation of walking is enhanced. As a result of this, a walking pattern having a high evaluation can be obtained, without requirement of a high order of expertise and/or a complicated work, in this way, it is possible to realize a robot device learning method that can make the walking pattern generating work easy.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A robot apparatus comprising:
   a plurality of legs respectively connected to a body to support said body;
   driving means for independently moving each of said legs;
   generating means for generating a plurality of walking patterns of the robot, each walking pattern being prescribed by a plurality of parameters;
   control means for controlling said driving means based on said plurality of parameters so that the robot walks according to said plurality of walking patterns;
   evaluating means for evaluating an adaptability of each of said plurality of walking patterns to each of a plurality of walking surfaces, whereby the robot evaluates said walking patterns by searching for, detecting and walking toward a target; and
   updating means for updating said plurality of parameters based on the robot's own evaluation of said walking patterns,
   whereby said updating means updates said parameters prescribing said walking patterns according to a genetic algorithm.

2. The robot apparatus according to claim 1, wherein the evaluating means evaluates said plurality of walking patterns with respect to velocity and straightness.

3. A learning method for a walking robot, comprising the steps of:
   generating walking patterns of the robot, each walking pattern being prescribed by a plurality of parameters;
   controlling walking patterns of the robot based on said plurality of parameters;
   evaluating an adaptability of each of said plurality of walking patterns to each of a plurality of walking surfaces, whereby the robot evaluates said walking patterns by searching for, detecting and walking toward a target; and
   updating said plurality of parameters based on the robot's own evaluation of said walking patterns, whereby said parameters prescribing said walking patterns are updated according to a genetic algorithm.

4. The method according to claim 3, wherein the plurality of walking patterns are evaluated with respect to velocity and straightness.

5. The method according to claim 3, wherein at least one of the walking surfaces is irregular.

6. The method according to claim 3, wherein at least one of the walking surfaces is provided with a plurality of obstructions.

7. A robot apparatus comprising:
   a plurality of legs respectively connected to a body to support said body;
   driving means for independently moving each of said legs;
   generating means for generating a plurality of walking patterns of the robot, each walking pattern being prescribed by a plurality of parameters;
   control means for controlling said driving means based on said plurality of parameters so that the robot walks according to said plurality of walking patterns;
   evaluating means for evaluating an adaptability of each of said plurality of walking patterns to each of a plurality of walking surfaces, whereby the robot evaluates said walking patterns by searching for, detecting and walking toward a target, wherein the evaluating means is operable to:
     search and detect a first target located in a first position;
     cause the robot to walk, according to a first walking pattern, toward the first target;
     calculate the velocity and straightness of the robot while the robot walks toward the first target;
     search and detect a second target located in a second position;
     cause the robot to walk, according to a second walking pattern, toward the second target; and
     calculate the velocity and straightness of the robot while the robot walks toward the second target; and
   updating means for updating said plurality of parameters based on the robot's own evaluation of said walking patterns,
   whereby said updating means updates said parameters prescribing said walking patterns according to a genetic algorithm.

* * * * *